US010895163B2

(12) United States Patent
Schiavo

(10) Patent No.: US 10,895,163 B2
(45) Date of Patent: Jan. 19, 2021

(54) SEAL ASSEMBLY BETWEEN A TRANSITION DUCT AND THE FIRST ROW VANE ASSEMBLY FOR USE IN TURBINE ENGINES

(71) Applicant: Siemens Aktiengesellschaft, Munich (DE)

(72) Inventor: Anthony L. Schiavo, Oviedo, FL (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 725 days.

(21) Appl. No.: 15/518,613

(22) PCT Filed: Oct. 28, 2014

(86) PCT No.: PCT/US2014/062499
§ 371 (c)(1),
(2) Date: Apr. 12, 2017

(87) PCT Pub. No.: WO2016/068857
PCT Pub. Date: May 6, 2016

(65) Prior Publication Data
US 2017/0248027 A1 Aug. 31, 2017

(51) Int. Cl.
*F01D 25/24* (2006.01)
*F01D 11/00* (2006.01)
(Continued)

(52) U.S. Cl.
CPC ............ *F01D 11/005* (2013.01); *F01D 9/023* (2013.01); *F01D 9/041* (2013.01); *F16J 15/0887* (2013.01);
(Continued)

(58) Field of Classification Search
CPC .... F01D 9/023; F01D 11/005; F05D 2240/55; F05D 2220/32; F05D 2260/37
(Continued)

(56) References Cited

U.S. PATENT DOCUMENTS 5,509,669 A 4/1996 Wolfe et al.
5,749,218 A 5/1998 Cromer et al.
(Continued)

FOREIGN PATENT DOCUMENTS

EP 2634372 A1 9/2013
WO 2016036382 A1 10/2016

OTHER PUBLICATIONS

PCT International Search Report and Written Opinion dated May 27, 2015 corresponding to PCT Application No. PCT/US2014/062499 filed Oct. 28, 2014.

*Primary Examiner* — Long T Tran
*Assistant Examiner* — James J Kim

(57) ABSTRACT

A seal assembly between a transition seal structure associated with a downstream end of a transition duct and a vane seal structure associated with an upstream end of a vane structure in a first row vane assembly of a gas turbine engine includes a seal structure. The seal structure includes inner and outer seal members, each having a radially extending first leg and an axially extending second leg that provide each seal member with an L or V-shape. The seal members are arranged in a nested relationship with one of the seal members being positioned between the first and second legs of the other seal member. The first and/or second legs of the inner and outer seal members is/are received in a corresponding slot defined at least in part by one of the transition seal structure and the vane seal structure.

14 Claims, 8 Drawing Sheets

(51) Int. Cl.
*F01D 9/02* (2006.01)
*F16J 15/08* (2006.01)
*F01D 9/04* (2006.01)

(52) U.S. Cl.
CPC ...... *F05D 2220/32* (2013.01); *F05D 2250/75* (2013.01)

(58) Field of Classification Search
USPC .......... 415/173.1, 174.2, 214.1; 60/752, 796, 60/800
See application file for complete search history.

(56) References Cited

U.S. PATENT DOCUMENTS

| | | | |
|---|---|---|---|
| 5,915,697 A | 6/1999 | Bagepalli et al. | |
| 6,199,871 B1 | 3/2001 | Lampes | |
| 6,347,508 B1 * | 2/2002 | Smallwood | F01D 9/023 60/796 |
| 6,418,727 B1 | 7/2002 | Rice et al. | |
| 6,547,257 B2 | 4/2003 | Cromer | |
| 7,527,469 B2 | 5/2009 | Zborovsky et al. | |
| 7,549,845 B2 | 6/2009 | Uwami et al. | |
| 8,092,159 B2 | 1/2012 | Maldonado | |
| 8,118,549 B2 | 2/2012 | Schiavo | |
| 8,142,142 B2 | 3/2012 | Zborovsky et al. | |
| 8,459,041 B2 | 6/2013 | Flanagan et al. | |
| 8,491,259 B2 | 7/2013 | Sutcu | |
| 8,511,972 B2 | 8/2013 | Sutcu | |
| 2002/0121744 A1 | 9/2002 | Aksit et al. | |
| 2006/0123797 A1 * | 6/2006 | Zborovsky | F01D 9/041 60/800 |
| 2008/0053107 A1 * | 3/2008 | Weaver | F01D 9/023 60/800 |
| 2008/0101927 A1 * | 5/2008 | Strain | F01D 9/042 415/209.3 |
| 2010/0247286 A1 * | 9/2010 | Maldonado | F01D 5/186 415/1 |
| 2012/0119447 A1 * | 5/2012 | Demiroglu | F01D 11/003 277/637 |
| 2012/0200046 A1 * | 8/2012 | Green | F01D 11/02 277/647 |
| 2012/0292860 A1 * | 11/2012 | Moehrle | F01D 9/023 277/640 |
| 2017/0284210 A1 * | 10/2017 | Bartley | F01D 9/023 |

* cited by examiner

SEAL ASSEMBLY BETWEEN A TRANSITION DUCT AND THE FIRST ROW VANE ASSEMBLY FOR USE IN TURBINE ENGINES

TECHNICAL FIELD

The present invention relates to a seal assembly for use in gas turbine engines, and, more particularly, to a seal assembly between a downstream end of a transition duct and a first row vane assembly at an inlet into a turbine section of the engine.

BACKGROUND ART

A conventional combustible gas turbine engine includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The transition ducts are positioned adjacent to the combustors and route the working gases into the turbine section through turbine inlet structure associated with a first row vane assembly. Because the transition ducts and the turbine inlet structure are formed from different materials, they experience different amounts of thermal growth. That is, both the transition ducts and the turbine inlet structure may move radially, circumferentially, and/or axially relative to one another as a result of thermal growth of the respective components. Thus, seal assemblies are typically used in gas turbine engines between the transition ducts and the turbine inlet structure to minimize leakage between the working gases passing into the turbine section and cooling air, i.e., cold compressor discharge air, which is used to cool structure within the gas turbine engine.

SUMMARY OF INVENTION

In accordance with a first aspect of the present invention, a seal assembly is provided between a transition seal structure associated with a downstream end of a transition duct and a vane seal structure associated with an upstream end of a vane structure in a first row vane assembly of a gas turbine engine. The seal assembly comprises a first seal structure including inner and outer seal members, each seal member having a radially extending first leg and an axially extending second leg that extends transversely from a junction with the first leg to provide each seal member with an L or V-shape. Each seal member includes a plurality of circumferentially spaced apart notches extending from an edge of at least one of the first and second legs toward the junction. The inner and outer seal members are arranged in a nested relationship with one of the seal members being positioned between the first and second legs of the other seal member such that the respective junctions of the inner and outer seal members are adjacent to one another. At least one of the first and second legs of both of the inner and outer seal members is received in a corresponding slot defined at least in part by one of the transition seal structure and the vane seal structure. The inner and outer seal members are arranged such that at least some of the notches of the inner seal member are not circumferentially aligned with the notches of the outer seal member.

The slot may be entirely defined by the one of the transition seal structure and the vane seal structure.

The first and second legs of both of the inner and outer seal members may be received in corresponding first and second slots, the first slot defined at least in part by the transition seal structure and the second slot defined at least in part by the vane seal structure.

The seal assembly may further comprise an anti-rotation pin extending from at least one of the transition seal structure and the vane seal structure into corresponding anti-rotation slots formed in the inner and outer seal members, the anti-rotation pin militating against circumferential movement of the inner and outer seal members relative to the at least one of the transition seal structure and the vane seal structure.

The inner and outer seal members may be arranged in a shiplap configuration such that a first circumferential end of the inner seal member is not circumferentially aligned with a first circumferential end of the outer seal member and a second circumferential end of the inner seal member is not circumferentially aligned with a second circumferential end of the outer seal member.

The vane seal structure may include an annular vane seal retainer that at least partially defines the slot that receives the at least one of the first and second legs of both of the inner and outer seal members, wherein the annular vane seal retainer provides a radial constraint for the seal structure for militating against radial movement of the seal structure with respect to the vane seal structure.

The transition seal structure may include a plurality of circumferentially spaced apart transition seal retainers that collectively at least partially define the slot, which receives the first legs of both of the inner and outer seal members.

The vane seal structure may include a plurality of circumferentially spaced apart vane seal retainers that collectively at least partially define a second slot, which receives the second legs of both of the inner and outer seal members.

The seal assembly may further comprise a side seal that extends radially from the first seal structure and seals a gap between the transition seal structure and a transition seal structure of a circumferentially adjacent transition duct.

The first seal structure may comprise an outer seal structure associated with a radially outer portion of the transition seal structure, and the seal assembly may further include a second seal structure comprising an inner seal structure having inner and outer seal members. Each seal member of the second seal structure includes a radially extending first leg and an axially extending second leg that extends transversely from a junction with the first leg to provide each seal member with an L or V-shape, each seal member including a plurality of circumferentially spaced apart notches extending from an edge of at least one of the first and second legs toward the junction. The inner and outer seal members of the second seal structure may be arranged in a nested relationship with one of the seal members being positioned between the first and second legs of the other seal member such that the respective junctions of the inner and outer seal members of the second seal structure are adjacent to one another. At least one of the first and second legs of both of the inner and outer seal members of the second seal structure may be received in a corresponding slot defined at least in part by one of the transition seal structure and the vane seal structure. The inner and outer seal members of the second seal structure may be arranged such that at least some of the notches of the inner seal member are not circumferentially aligned with the notches of the outer seal member.

In accordance with a second aspect of the present invention, a seal assembly is provided between a transition seal structure associated with a downstream end of a transition duct and a vane seal structure associated with an upstream end of a vane structure in a first row vane assembly of a gas turbine engine. The seal assembly comprises an outer seal structure including inner and outer seal members, each seal member having a radially extending first leg and an axially extending second leg that extends transversely from a junction with the first leg to provide each seal member with an L or V-shape. The inner and outer seal members are arranged in a nested relationship with one of the seal members being positioned between the first and second legs of the other seal member such that the respective junctions of the inner and outer seal members are adjacent to one another. At least one of the first and second legs of both of the inner and outer seal members is received in a corresponding slot defined at least in part by one of the transition seal structure and the vane seal structure. The seal assembly further comprises an inner seal structure including inner and outer seal members, each seal member of the inner seal structure having a radially extending first leg and an axially extending second leg that extends transversely from a junction with the first leg to provide each seal member with an L or V-shape. The inner and outer seal members of the inner seal structure are arranged in a nested relationship with one of the seal members being positioned between the first and second legs of the other seal member such that the respective junctions of the inner and outer seal members are adjacent to one another. At least one of the first and second legs of both of the inner and outer seal members of the inner seal structure is received in a corresponding slot defined at least in part by one of the transition seal structure and the vane seal structure.

The slots of the outer and inner seal structures may be entirely defined by the respective ones of the transition seal structure and the vane seal structure.

The first and second legs of both of the inner and outer seal members of each of the inner and outer seal structures may be received in corresponding first and second slots, the first slots defined at least in part by the transition seal structure and the second slots defined at least in part by the vane seal structure.

The seal assembly may further comprise respective outer and inner anti-rotation pins extending from at least one of the transition seal structure and the vane seal structure into corresponding anti-rotation slots formed in the inner and outer seal members of the respective inner and outer seal structures. The anti-rotation pins militate against circumferential movement of the corresponding inner and outer seal members of the outer and inner seal structures relative to the at least one of the respective transition seal structure and the vane seal structure.

The vane seal structure may include an annular vane seal retainer that at least partially defines the slot that receives the second legs of both of the inner and outer seal members of the outer seal structure, the annular vane seal retainer providing a radial constraint for the outer seal structure for militating against radial movement of the outer seal structure with respect to the vane seal structure. The transition seal structure may include at least one axial transition seal retainer that at least partially defines a second slot that receives the first legs of both of the inner and outer seal members of the outer seal structure, the axial transition seal retainer providing an axial constraint for the outer seal structure for militating against axial movement of the outer seal structure with respect to the transition seal structure.

The transition seal structure may include a plurality of circumferentially spaced apart transition seal retainers that collectively at least partially define the slot associated with the outer seal structure, which receives the first legs of both of the inner and outer seal members of the outer seal structure. The vane seal structure may include a plurality of circumferentially spaced apart vane seal retainers that collectively at least partially define a second slot associated with the outer seal structure, which receives the second legs of both of the inner and outer seal members of the outer seal structure.

The seal assembly may further comprise a side seal that extends radially from the outer seal structure to the inner seal structure and seals a gap between the transition seal structure and a transition seal structure of a circumferentially adjacent transition duct.

Each of the inner and outer seal members of the inner and outer seal structures may include a plurality of circumferentially spaced apart notches extending from an edge of at least one of the first and second legs of the respective seal members toward the corresponding junction. The inner and outer seal members of the inner and outer seal structures may be arranged such that at least some of the notches of the inner seal members are not circumferentially aligned with the notches of the corresponding outer seal members.

BRIEF DESCRIPTION OF DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DESCRIPTION OF EMBODIMENTS

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
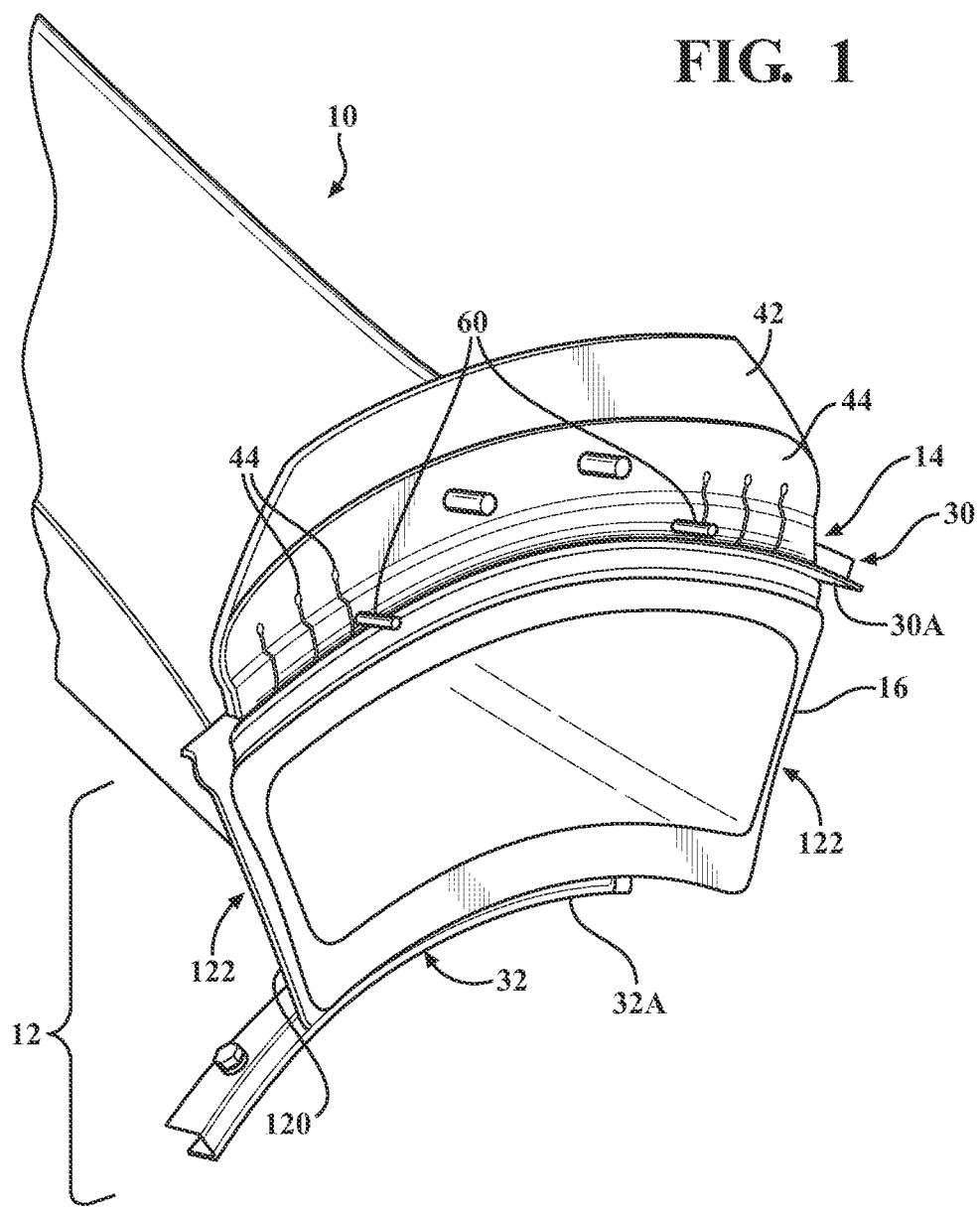
FIG. 1 is a perspective view of a transition duct including a portion of a seal assembly according to an embodiment of the invention.

Referring to FIG. 1, a transition duct 10 and a portion of a seal assembly 12 according to an aspect of the invention are shown. The seal assembly 12 is positioned between and supported by a transition seal structure 14 associated with a downstream end 16 of the transition duct 10 and a vane seal structure 18 associated with an upstream end 20 of a vane structure 22 in a first row vane assembly 24 (see FIG. 3) of a gas turbine engine. As will be described herein, the seal assembly 12 limits leakages of fluids between a hot gas path 26 (see FIG. 3) that passes from the transition duct 10 through a turbine section 28 of the engine and areas proximate to the first row vane assembly 24 and in the turbine section 28 that contain cooling fluid for cooling structure to be cooled within the engine. That is, the seal assembly 12 limits leakage of the hot working gases in the hot gas path 26 into these areas and also limits leakage of the cooling fluid in these areas into the hot gas path 26. As will be appreciated by those having original skill in the art, a typical can-annular combustion system in a gas turbine engine includes a plurality of circumferentially spaced apart transition ducts 10 associated with corresponding combustor assemblies, and the first row vane assembly 24 extends circumferentially around a rotor (not shown) extending through the turbine section 28.

Figure 3:
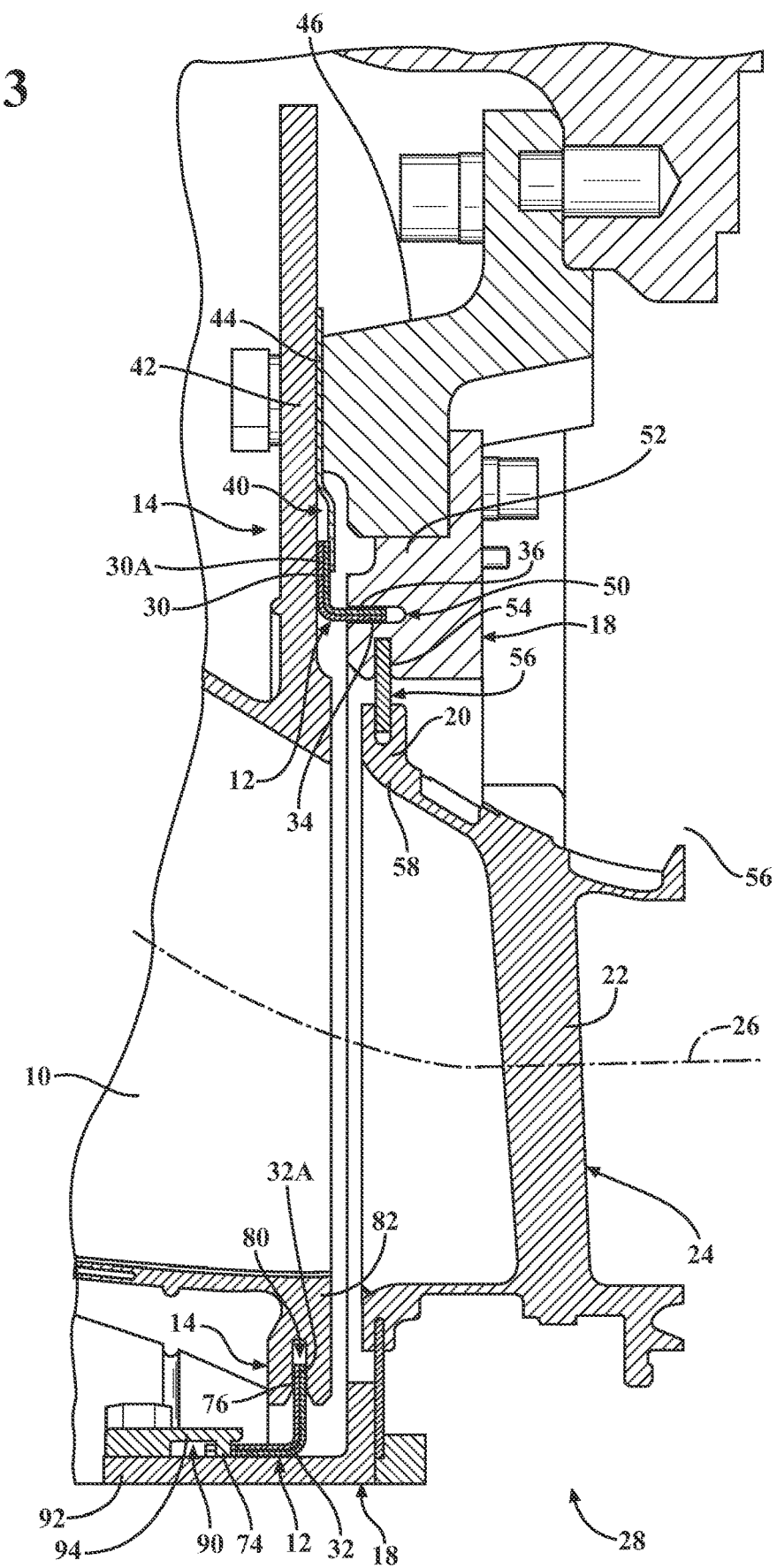
FIG. 3 is a side cross sectional view of the transition duct and seal assembly of FIG. 1 and also of a vane structure that cooperates with the transition duct to support the seal assembly.

The seal assembly 12 includes an outer seal structure 30 associated with a radially outer portion of the seal assembly 12, and an inner seal structure 32 associated with a radially inner portion of the seal assembly 12, see FIG. 3. The outer and inner seal structures 30, 32 are each formed from a plurality of circumferentially adjacent seal structure segments 30A, 32A, which may be formed from a thin sheet of a superalloy material, such as, for example, INCONEL 718 (INCONEL is a registered trademark of Special Metals Corporation, located in New Hartford, N.Y.).

Figure 2:
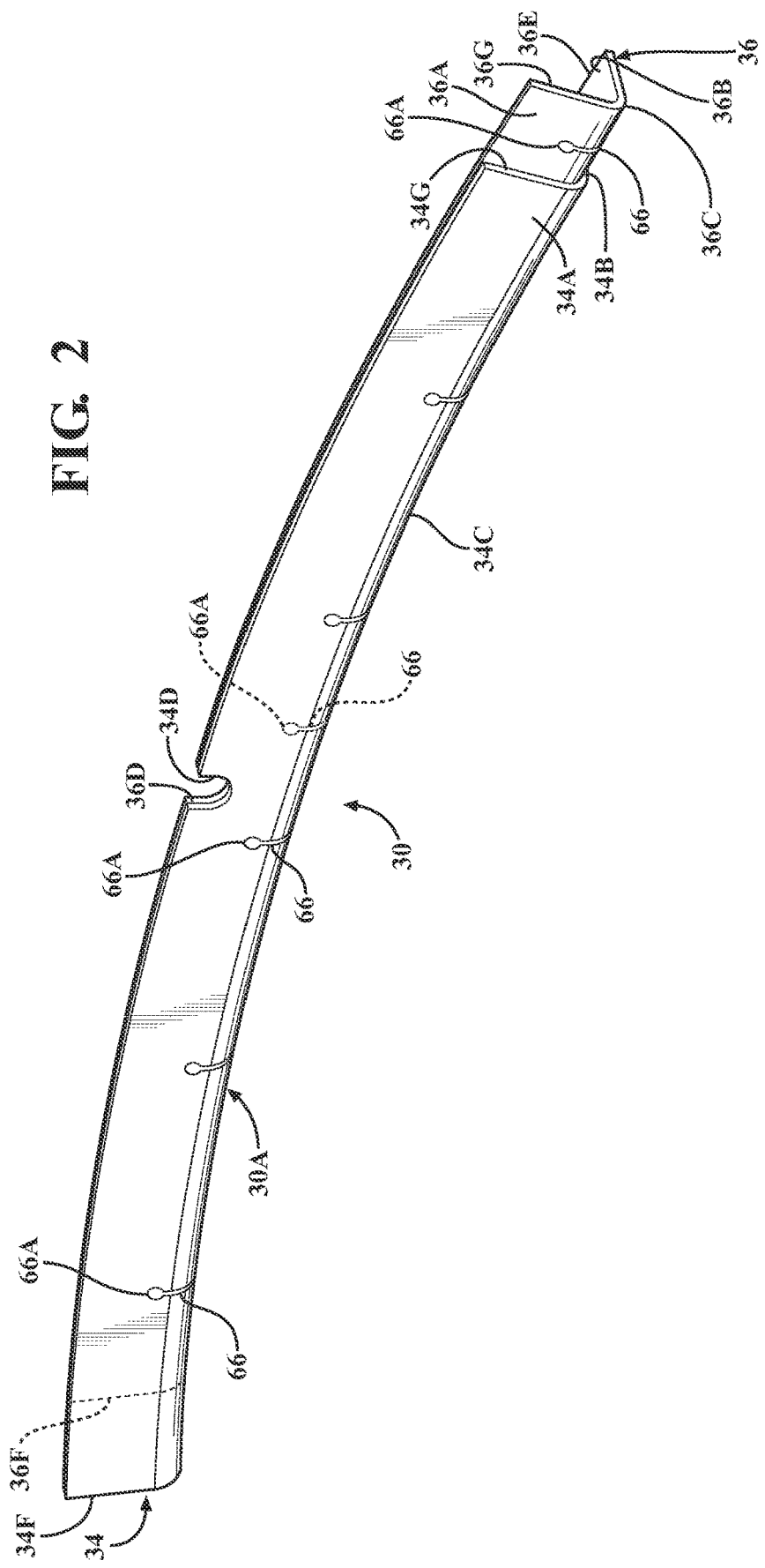
FIG. 2 is a perspective view of a segment of an outer seal structure of the seal assembly of FIG. 1.

Referring to FIG. 2, the outer seal structure 30 comprises inner and outer seal members 34, 36, each having a V or L-shape. The V or L-shape of each seal member 34, 36 is formed by respective radially extending first legs 34A, 36A and axially extending second legs 34B, 36B that extend transversely, e.g., at an angle of approximately 90 degrees, from a junction 34C, 36C with the corresponding first leg 34A, 36A. As shown in FIG. 2, the inner and outer seal members 34, 36 are arranged in a nested relationship, wherein the outer seal member 36 is positioned between the first and second legs 34A, 34B of the inner seal member 34 such that the respective junctions 34C, 36C of the inner and outer seal members 34, 36 are adjacent to one another and contact one another. The first and/or second legs 34A, 36A, 34B, 36B may be spot welded together to prevent separation/relative movement between the inner and outer seal members 34, 36.

Figure 4:
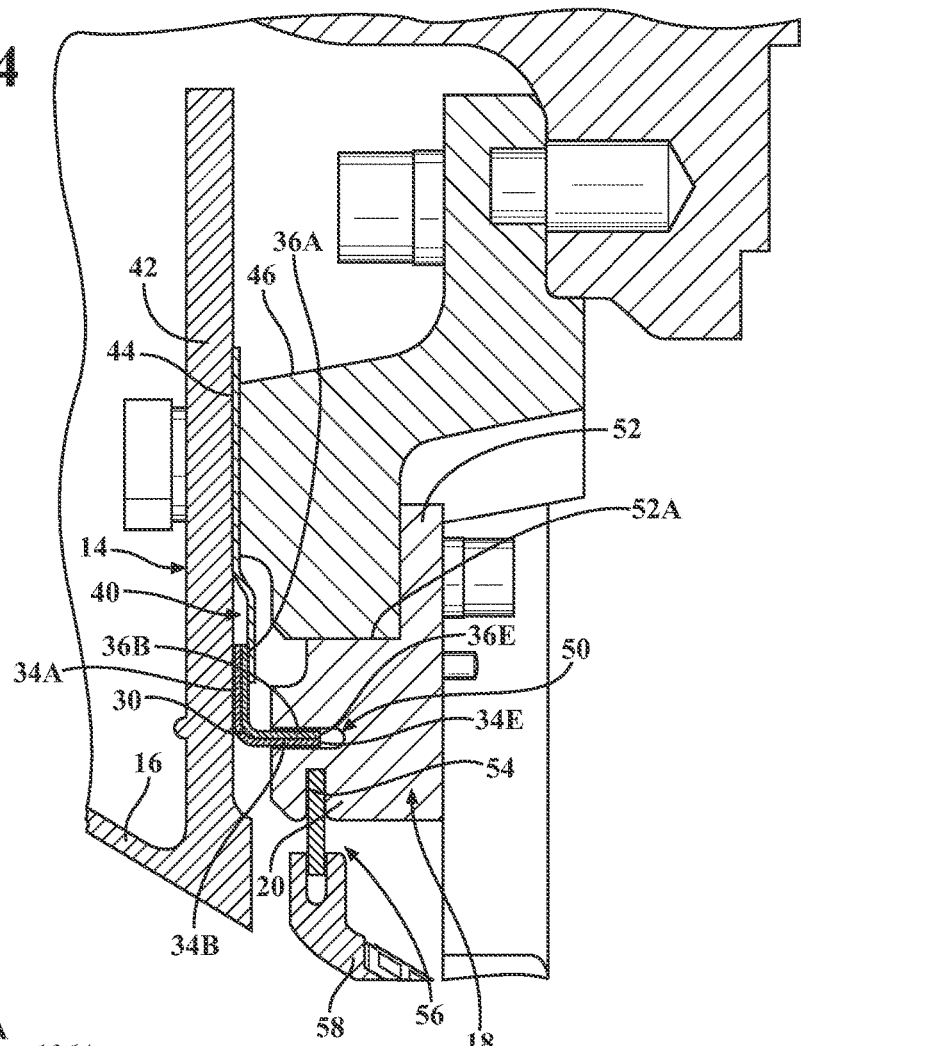
FIG. 4 is an enlarged view showing an outer portion of the structure illustrated in FIG. 3.

Referring now to FIGS. 3 and 4, the first and second legs 34A, 36A, 34B, 36B of both of the inner and outer seal members 34, 36 are received in corresponding slots defined at least in part by the transition seal structure 14 and the vane seal structure 18. More specifically, the first legs 34A, 36A of the inner and outer seal members 34, 36 are received in an outer transition slot 40 defined by an annular flange 42 of the transition seal structure 14 that extends radially outwardly from the downstream end 16 of the transition duct 10, and an annular outer seal retainer 44 (also referred to herein as an "axial transition seal retainer") that is affixed, e.g., bolted, to the flange 42. The outer seal retainer 44 and the flange 42 are also affixed, e.g., bolted, to a portion of an engine casing 46 that extends about the engine to provide structural support for the transition duct 10. The second legs 34B, 36B of the inner and outer seal members 34, 36 are received in an outer vane slot 50 defined by an annular outer vane seal retainer 52 of the vane seal structure 18. The outer vane seal retainer 52 is also affixed, e.g., bolted, to the engine casing 46, see FIGS. 3 and 4. The outer vane seal retainer 52 also receives a first row vane seal 54 that seals a gap 56 between the outer vane seal retainer 52 and an outer shroud 58 of the first row vane assembly 24.

The first legs 34A, 36A of the inner and outer seal members 34, 36 are preferably received relatively tightly within the outer transition slot 40 to minimize axial movement of the outer seal structure 30 relative to the transition seal structure 14, the axial direction corresponding to a general direction of hot gas flow through the hot gas path 26 through the turbine section 28, e.g., left to right as shown in FIG. 3. That is, the first legs 34A, 36A of the inner and outer seal members 34, 36 are preferably received tightly enough within the outer transition slot 40 to provide an axial restraint for the outer seal structure 30 for militating against axial movement of the outer seal structure 30 relative to the transition seal structure 14 while still permitting a small amount of thermal expansion of one or both of the outer seal structure 30 and the transition seal structure 14 during operation of the engine. Similarly, the second legs 34B, 36B of the inner and outer seal members 34, 36 are preferably received relatively tightly within the outer vane slot 50 to minimize radial movement of the outer seal structure 30 relative to the vane seal structure 18. That is, the second legs 34B, 36B of the inner and outer seal members 34, 36 are preferably received tightly enough within the outer vane slot 50 to provide a radial restraint for the outer seal structure 30 for militating against radial movement of the outer seal structure 30 relative to the vane seal structure 18 while still permitting a small amount of thermal expansion of one or both of the outer seal structure 30 and the vane seal structure 18 during operation of the engine.

It is noted that while the first legs 34A, 36A of the inner and outer seal members 34, 36 are received in an outer transition slot 40 that is only partially defined by the transition seal structure 14, i.e., since the outer seal retainer 44 defines an axially downstream side of the outer transition slot 40, the outer transition slot 40 could be entirely defined by the transition seal structure 14, e.g., wherein a groove or slot is cut out of the flange 42, wherein the first legs 34A, 36A of the inner and outer seal members 34, 36 would be located within an outer transition slot that is entirely defined by the transition seal structure 14. If the outer transition slot were to be entirely defined by the transition seal structure 14, the outer vane slot 50 may be defined only partially by the outer vane seal retainer 52, e.g., wherein the outer vane slot 50 could be defined between an outer surface 52A of the outer vane seal retainer 52 and an axially extending plate or series of circumferentially spaced apart tabs.

Referring back to FIG. 1, a plurality of outer anti-rotation pins 60 extend axially from the flange 42 through corresponding outer anti-rotation slots 34D, 36D (see FIG. 2) formed in the inner and outer seal members 34, 36. The outer anti-rotation pins 60 shown in FIG. 1 also extend through the outer seal retainer 44, although that need not be the case, i.e., the outer anti-rotation pins 60 could extend up to but not extend through the outer seal retainer 44.

As shown in FIG. 2, the slots 34D, 36D are formed in the first legs 34A, 36A of the inner and outer seal members 34, 36 and are circumferentially aligned with one another such that the outer anti-rotation pins 60 extend through both of the inner and outer seal members 34, 36 to militate against circumferential (rotational) movement of the outer seal structure 30 relative to the transition seal structure 14 and the vane seal structure 18. While the outer anti-rotation pins 60 illustrated in FIG. 1 extend axially from the flange 42 of the transition seal structure 14, the outer anti-rotation pins 60 could additionally or alternatively extend radially from the outer vane seal retainer 52 of the vane seal structure 18, wherein the slots 34D, 36D would correspondingly be located in the second legs 34B, 36B of the seal members 34, 36.

Referring still to FIG. 2, each seal member 34, 36 further includes a plurality of circumferentially spaced apart notches 66. The notches 66 extend from an edge 34E, 36E (the edges 34E, 36E are shown in FIG. 4) of the respective second legs 34B, 36B toward the corresponding junction 34C, 36C. As shown in FIG. 2, the notches 66 extend through the junctions 34C, 36C of the seal members 34, 36 and radially outwardly into the first legs 34A, 36A. The notches 66 accommodate thermal expansion of the seal members 34, 36 during operation, i.e., by allowing the seal members 34, 36 an amount of contraction and/or expansion, when heated or cooled during various engine operating states. As shown in FIG. 2, the notches 66 include enlarged portions or keyholes 66A at ends of the notches 66 distal from the edges 34E, 36E of the second legs 34B, 36B.

The inner and outer seal members 34, 36 are arranged such that at least some of the notches 66 of the inner seal member 34 (and preferably all of the notches 66 of the inner seal member 34) are not circumferentially aligned with the notches 66 of the outer seal member 36, see FIG. 2. Hence, while a small amount of cooling fluid may be metered through the outer seal structure 30, i.e., through the notches 66, the total amount of leakage through the outer seal structure 30 is reduced due to the notches 66 of the inner and outer seal members 34, 36 not being circumferentially aligned, since a direct radial path is not provided through the inner and outer seal members 34, 36.

The inner and outer seal members 34, 36 are also arranged in a shiplap configuration, wherein a first circumferential end 34F of the inner seal member 34 is not circumferentially aligned with a first circumferential end 36F of the outer seal member 36, and a second circumferential end 34G of the inner seal member 34 is not circumferentially aligned with a second circumferential end 36G of the outer seal member 36. Hence, any circumferential gaps between the inner seal member 34 and inner seal members 34 of circumferentially adjacent outer seal structure segments 30A are not circumferentially aligned with any circumferential gaps between the outer seal member 36 and outer seal members 36 of circumferentially adjacent outer seal structure segments 30A, such that direct radial leakage paths are avoided. It is noted that the first and/or second legs 34A, 36A, 34B, 36B of each segment 30A may be spot welded to the second and/or first legs 34B, 36B, 34A, 36A of the adjacent segments 30A to prevent separation/relative movement between the segments 30A, although the connections between the segments 30A may serve as hinges for conforming to a deformation of the transition seal structure 14 during operation of the engine as will be described below.

Figure 5:
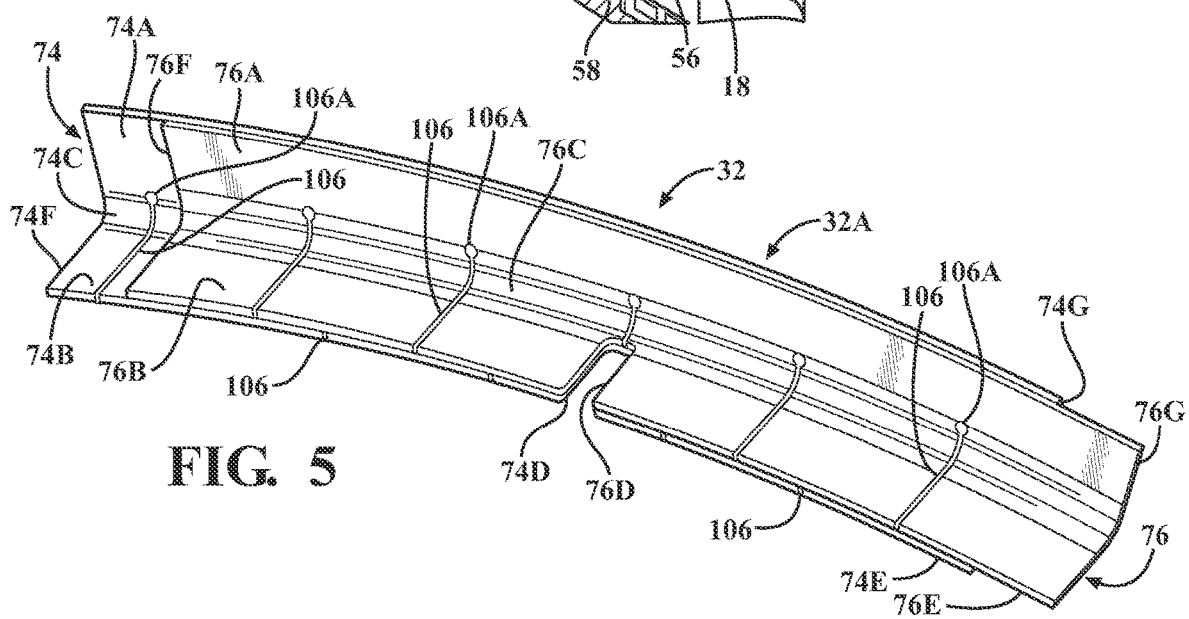
FIG. 5 is a perspective view of a segment of an inner seal structure of the seal assembly of FIG. 1.

Referring to FIG. 5, the inner seal structure 32 comprises inner and outer seal members 74, 76, each having a V or L-shape. The V or L-shape of each seal member 74, 76 is formed by radially extending first legs 74A, 76A and axially extending second legs 74B, 76B that extends transversely, e.g., at an angle of approximately 90 degrees, from a junction 74C, 76C with the corresponding first leg 74A, 76A. As shown in FIG. 5, the inner and outer seal members 74, 76 are arranged in a nested relationship, wherein the outer seal member 76 is positioned between the first and second legs 74A, 74B of the inner seal member 74 such that the respective junctions 74C, 76C of the inner and outer seal members 74, 76 are adjacent to one another and contact one another. The first and/or second legs 74A, 76A, 74B, 76B may be spot welded together to prevent separation/relative movement between the inner and outer seal members 74, 76.

Figure 6:
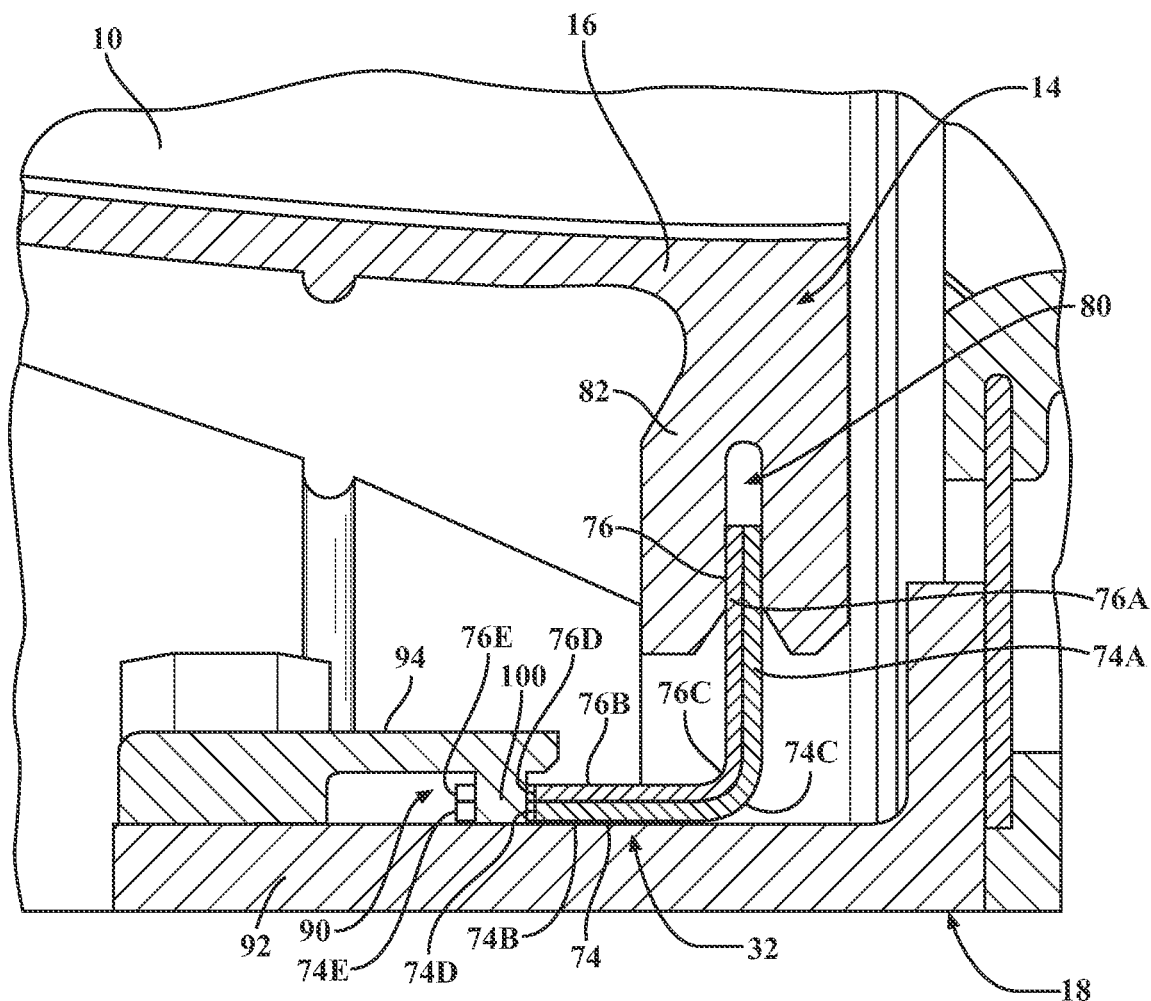
FIG. 6 is an enlarged view showing an inner portion of the structure illustrated in FIG. 3.
Figure 7:
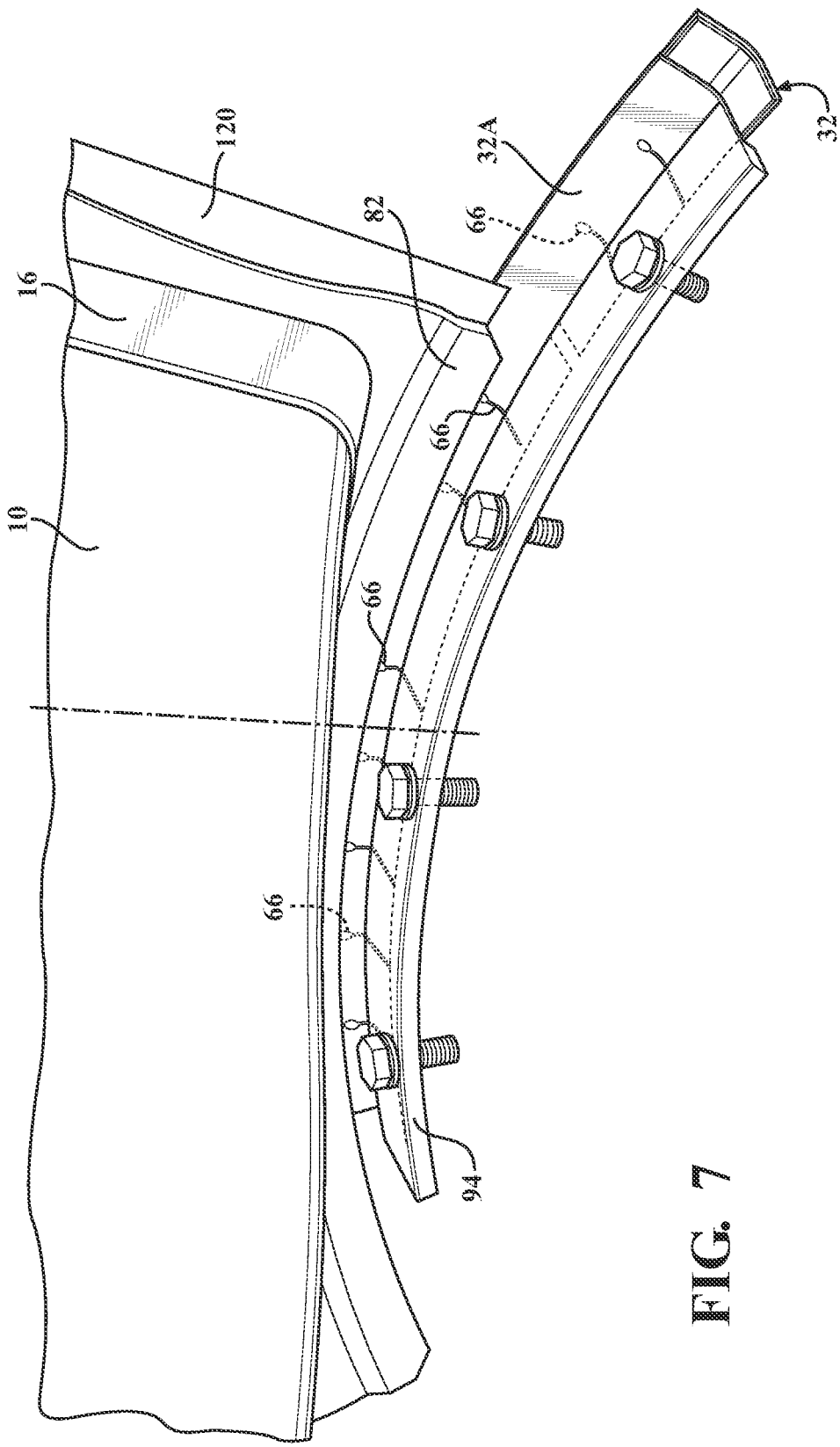
FIG. 7 is a partial perspective view of a portion of the transition duct and seal assembly portion of FIG. 1.

Referring now to FIGS. 3 and 6, the first and second legs 74A, 76A, 74B, 76B of both of the inner and outer seal members 74, 76 are received in corresponding slots defined at least in part by the transition seal structure 14 and the vane seal structure 18. More specifically, the first legs 74A, 76A of the inner and outer seal members 74, 76 are received in an inner transition slot 80 defined by an inner flange 82 (also referred to herein as an "axial transition seal retainer") of the transition seal structure 14 that extends radially inwardly from the downstream end 16 of the transition duct 10. The second legs 74B, 76B of the inner and outer seal members 74, 76 are received in an inner vane slot 90 defined by an annular inner vane seal retainer 92 of the vane seal structure 18 and an annular inner seal retainer plate 94 that is affixed, e.g., bolted, to the annular inner vane seal retainer 92.

The first legs 74A, 76A of the inner and outer seal members 74, 76 are preferably received relatively tightly within the inner transition slot 80 to minimize axial movement of the inner seal structure 32 relative to the transition seal structure 14. That is, the first legs 74A, 76A of the inner and outer seal members 74, 76 are preferably received tightly enough within the inner transition slot 80 to provide an axial restraint for the inner seal structure 32 for militating against axial movement of the inner seal structure 32 relative to the transition seal structure 14 while still permitting a small amount of thermal expansion of one or both of the inner seal structure 32 and the transition seal structure 14 during operation of the engine. Similarly, the second legs 74B, 76B of the inner and outer seal members 74, 76 are preferably received relatively tightly within the inner vane slot 90 to minimize radial movement of the inner seal structure 32 relative to the vane seal structure 18. That is, the second legs 74B, 76B of the inner and outer seal members 74, 76 are preferably received tightly enough within the inner vane slot 90 to provide a radial restraint for the inner seal structure 32 for militating against radial movement of the inner seal structure 32 relative to the vane seal structure 18 while still permitting a small amount of thermal expansion of one or both of the inner seal structure 32 and the vane seal structure 18 during operation of the engine.

It is noted that while the second legs 74B, 76B of the inner and outer seal members 74, 76 are received in an inner vane slot 90 that is only partially defined by the vane seal structure 18, i.e., since the annular inner vane seal retainer plate 94 defines a radially outer side of the inner transition slot 90, the inner vane slot 90 could be entirely defined by the vane seal structure 18, e.g., wherein a groove or slot is cut out of the annular inner vane seal retainer 92, wherein the second legs 74B, 76B of the inner and outer seal members 74, 76 would be located within an inner vane slot that is entirely defined by the vane seal structure 18. If the inner vane slot were to be entirely defined by the vane seal structure 18, the inner transition slot 80 may be defined only partially by the inner flange 82, e.g., wherein the inner transition slot 80 could be defined between an axially upstream or downstream surface of the inner flange 82 and a radially extending plate or series of circumferentially spaced apart tabs.

As shown in FIG. 6, a plurality of inner anti-rotation pins 100 (only one shown in FIG. 6) extend radially between the inner vane seal retainer 92 and the annular inner seal retainer plate 94 through corresponding outer anti-rotation slots 74D, 76D (see also FIG. 5) formed in the inner and outer seal members 74, 76. As shown in FIG. 5, the slots 74D, 76D are formed in the second legs 74B, 76B of the inner and outer seal members 74, 76 and are circumferentially aligned with one another such that the inner anti-rotation pins 100 extend through both of the inner and outer seal members 74, 76 to militate against circumferential (rotational) movement of the inner seal structure 32 relative to the transition seal structure 14 and the vane seal structure 18. While the inner anti-rotation pins 100 illustrated in FIG. 6 extend radially from the inner vane seal retainer 92 to the inner seal retainer plate 94 and are formed as an integral portion of the inner seal retainer plate 94, the inner anti-rotation pins 100 could additionally or alternatively extend axially from the inner flange 92 of the transition seal structure 14, wherein the slots 74D, 76D would correspondingly be located in the first legs 74A, 76A of the seal members 74, 76.

As shown most clearly in FIG. 5, each seal member 74, 76 further includes a plurality of circumferentially spaced apart notches 106 extending from an edge 74E, 76E of the respective second legs 74B, 76B toward the corresponding junction 74C, 76C. In the embodiment shown, the notches 106 extend through the junctions 74C, 76C of the seal members 74, 76 and radially outwardly into the first legs 74A, 76A. The notches 106 accommodate thermal expansion of the seal members 74, 76 during operation, i.e., by allowing the seal members 74, 76 an amount of contraction and/or expansion, when heated or cooled during various operating states. As shown in FIG. 5, the notches 106 include enlarged portions or keyholes 106A at ends of the notches distal from the edges 74E, 76E of the second legs 74B, 76B.

Referring still to FIG. 5, the inner and outer seal members 74, 76 are arranged such that at least some of the notches 106 of the inner seal member 74 (and preferably all of the notches 106 of the inner seal member 74) are not circumferentially aligned with the notches 106 of the outer seal member 76. Hence, while a small amount of cooling fluid may be metered through the inner seal structure 32, i.e., through the notches 106, the total amount of leakage through the inner seal structure 32 is reduced due to the notches 106 of the inner and outer seal members 74, 76 not being circumferentially aligned, since a direct radial path is not provided through the inner and outer seal members 74, 76.

The inner and outer seal members 74, 76 are also arranged in a shiplap configuration, wherein a first circumferential end 74F of the inner seal member 74 is not circumferentially aligned with a first circumferential end 76F of the outer seal member 76, and a second circumferential end 74G of the inner seal member 74 is not circumferentially aligned with a second circumferential end 76G of the outer seal member 76. Hence, any circumferential gaps between the inner seal member 74 and inner seal members 74 of circumferentially adjacent inner seal structure segments 32A are not circumferentially aligned with any circumferential gaps between the outer seal member 76 and outer seal members 76 of circumferentially adjacent inner seal structure segments 32A, such that direct radial leakage paths are avoided. It is noted that the first and/or second legs 74A, 76A, 74B, 76B of each segment 32A may be spot welded to the second and/or first legs 74B, 76B, 74A, 76A of the adjacent segments 32A to prevent separation/relative movement between the segments 32A, although the connections between the segments 32A may serve as hinges for conforming to a deformation of the transition seal structure 14 during operation of the engine as will be described below.

With reference back to FIG. 1, the seal assembly 12 further comprises a plurality of radially extending side seals 120 (one shown in FIG. 1) that are positioned between the downstream ends 16 of circumferentially adjacent transition ducts 10. The side seals 120 extend radially from the outer seal structures 30 to the inner seal structures 32 and seal gaps 122 between the circumferentially adjacent transition ducts 10, although an amount of cooling fluid may be metered through the side seals 120 as desired.

During operation of the engine, the seal assembly 12 described herein limits leakage of fluids between the hot gas path 26 and areas containing cooling fluid near the downstream end 16 of the transition duct 10 and the first row vane assembly 24 as discussed above. The arrangement and the configuration of the outer and inner seal structures 30, 32 repositions a seal load surface relative to the surrounding components such that detrimental stresses of these components are believed to be neutralized, which yields better part life. Further, conventional plasma sprayed wear coatings can be applied to the outer and inner seal structures 30, 32 to further increase the life of the outer and inner seal structures 30, 32.

Moreover, in addition to accommodating thermal expansion as discussed above, the notches 66, 106 formed in the seal members 34, 36, 74, 76 provide the seal members 34, 36, 74, 76 with flexibility to conform to the surfaces that the seal members 34, 36, 74, 76 contact during operation of the engine, thus increasing sealing efficiency of the seal assembly 12. The shiplap arrangement of the inner and outer seal members 34, 36, 74, 76 of the outer and inner seal structures 30, 32 also increases sealing efficiency of the seal assembly 12 by allowing each of the seal structure segments 30A, 32A to hinge with respect to one another, which permits the outer and inner seal structures 30, 32 to distort with the deformation of the transition seal structure 14 during operation. Additionally, the keyholes 66A, 106A at the ends of the notches 66, 106 serve to spread out stress to reduce or avoid the tendency for cracking in the seal members 34, 36, 74, 76. The outer seal retainer 44 may also include circumferentially spaced apart grooves 44A with corresponding keyholes (see FIG. 1) to provide the outer seal retainer 44 with flexibility and to reduce or avoid the tendency for cracking in the outer seal retainer 44.

Figure 8:
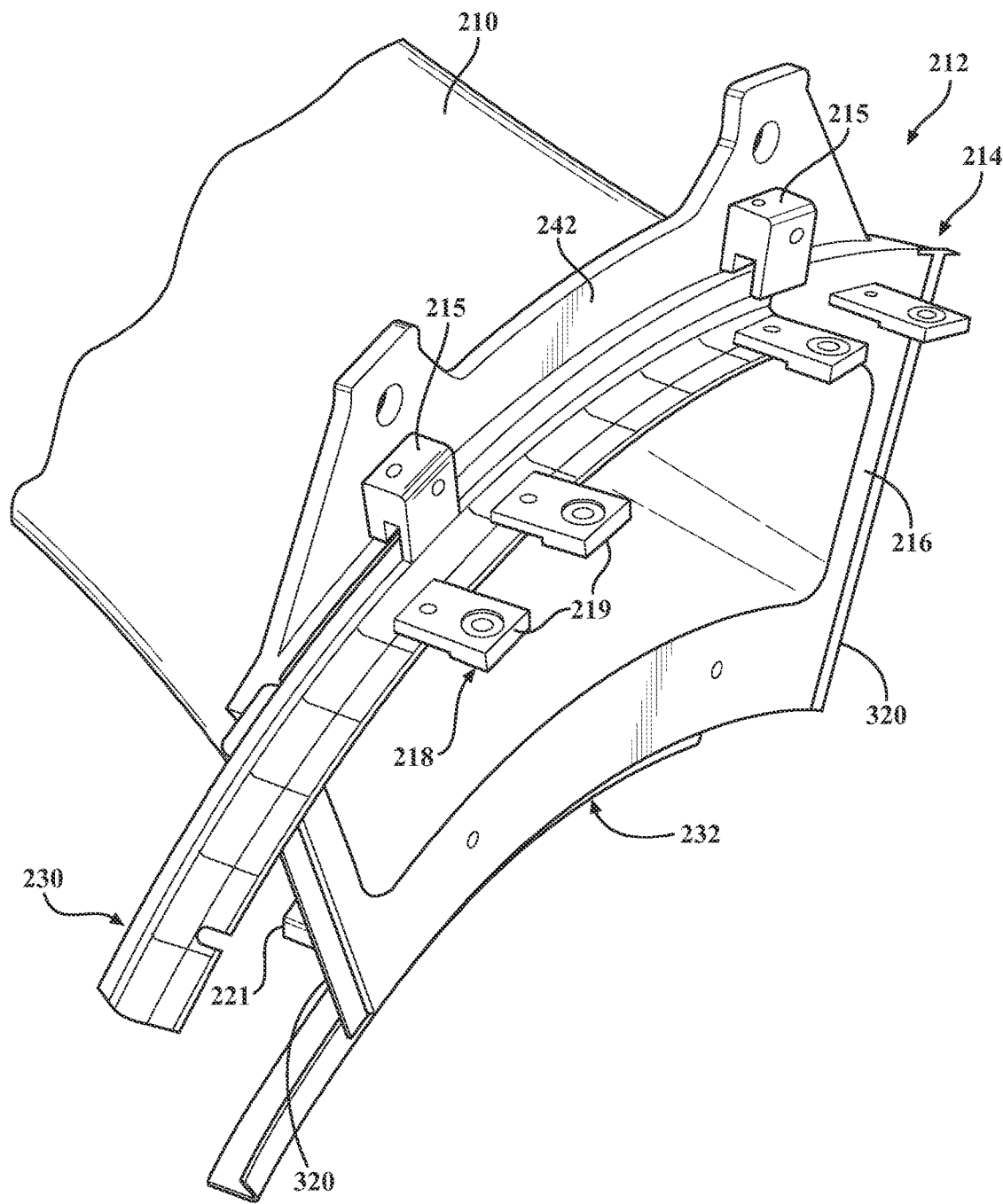
FIGS. 8 and 9 are perspective views of a transition duct and seal assembly portion according to another embodiment of the invention.
Figure 9:
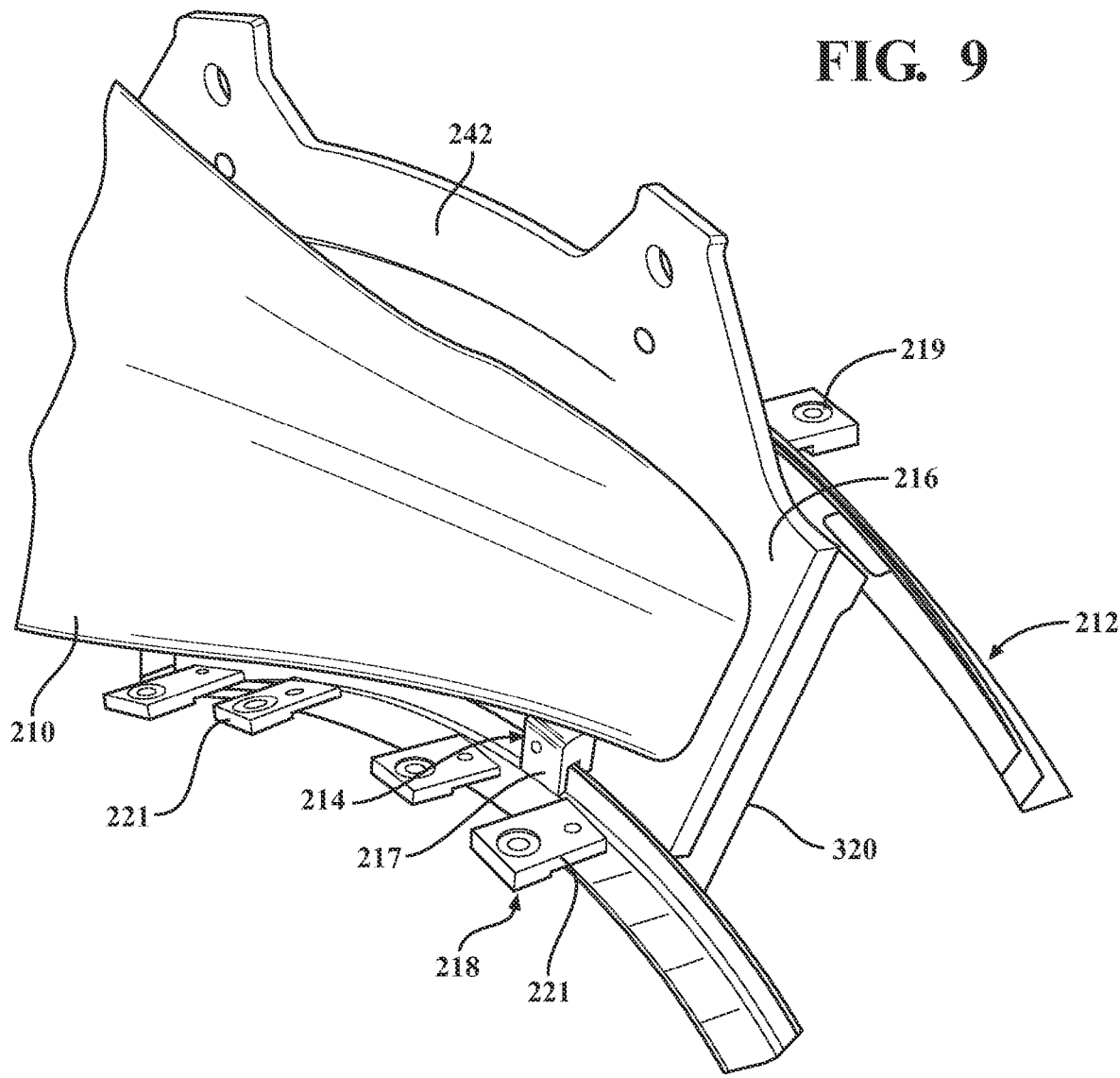

Referring now to FIGS. 8 and 9, a seal assembly 212 according to another aspect of the invention is shown, where structure similar to that described above for FIGS. 1-7 includes the same reference number increased by 200. Only structure that is different than that described above for FIGS. 1-7 will be described for FIGS. 8 and 9.

As shown in FIG. 8, the transition seal structure 214 according to this embodiment includes a plurality of circumferentially spaced apart outer transition seal retainers 215 that collectively define the outer transition slot 240, which receives the first legs 234A, 236A of both of the inner and outer seal members 234, 236 of the outer seal structure 230.

The vane seal structure 218 according to this embodiment includes a plurality of circumferentially spaced apart outer vane seal retainers 219 that collectively partially define the outer vane slot 250, which receives the second legs 234B, 236B of both of the inner and outer seal members 234, 236 of the outer seal structure 230. The annular outer vane seal retainer (not shown) of the vane seal structure 218 forms an inner boundary for the outer vane slot 250 in this embodiment.

Referring now to FIG. 9, the transition seal structure 214 according to this embodiment further includes a plurality of circumferentially spaced apart inner transition seal retainers 217 (only one shown in FIG. 9) that collectively define the inner transition slot 280, which receives the first legs 274A, 276A of both of the inner and outer seal members 274, 276 of the inner seal structure 232.

The vane seal structure 218 according to this embodiment further includes a plurality of circumferentially spaced apart inner vane seal retainers 221 that collectively partially define the inner vane slot 290, which receives the second legs 274B, 237B of both of the inner and outer seal members 274, 276 of the inner seal structure 232. The annular inner vane seal retainer (not shown) of the vane seal structure 218 forms an inner boundary for the inner vane slot 290 in this embodiment.

Remaining structure and function of the seal assembly 212 is the same as that of the seal assembly 12 described above.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly between a transition seal structure associated with a downstream end of a transition duct and a vane seal structure associated with an upstream end of a vane structure in a first row vane assembly of a gas turbine engine, the seal member comprising:
 a first seal structure comprising inner and outer seal members, each seal member having a radially extending first leg and an axially extending second leg that extends transversely from a junction with the first leg to provide each seal member with an L or V-shape, each seal member including a plurality of circumferentially spaced apart notches extending from an edge of at least one of the first and second legs toward the junction;
 wherein:
  the inner and outer seal members are arranged in a nested relationship with one of the seal members being positioned between the first and second legs of the other seal member such that the respective junctions of the inner and outer seal members are adjacent to one another;
  at least one of the first and second legs of both of the inner and outer seal members is received in a corresponding slot defined at least in part by one of the transition seal structure and the vane seal structure;
  the inner and outer seal members are arranged such that at least some of the notches of the inner seal member are not circumferentially aligned with the notches of the outer seal member; and
  the inner and outer seal members comprise anti-rotation slots, the anti-rotation slots are formed in the at least one of the first and second legs of both of the inner and outer seal members and are circumferentially aligned with one another,
 wherein the first legs of both of the inner and outer seal members are received in a first slot,
 wherein the first slot is defined by an annular flange of the transition seal structure,
 wherein the first slot comprises a plurality of circumferentially spaced apart transition seal retainers that are affixed to the annular flange, and
 wherein at least a portion of the first legs of both of the inner and outer seal members are arranged between the annular flange and the plurality of circumferentially spaced apart transition seal retainers.

2. The seal assembly of claim 1, wherein the second legs of both of the inner and outer seal members are received in second slot, the second slot defined at least in part by the vane seal structure.

3. The seal assembly of claim 1, further comprising an anti-rotation pin extending from at least one of the transition seal structure and the vane seal structure into the corresponding anti-rotation slots, the anti-rotation pin militating against circumferential movement of the inner and outer seal members relative to the at least one of the transition seal structure and the vane seal structure.

4. The seal assembly of claim 1, wherein the inner and outer seal members are arranged in a shiplap configuration such that a first circumferential end of the inner seal member is not circumferentially aligned with a first circumferential end of the outer seal member and a second circumferential end of the inner seal member is not circumferentially aligned with a second circumferential end of the outer seal member.

5. The seal assembly of claim 1, wherein the vane seal structure includes a plurality of circumferentially spaced apart vane seal retainers that collectively at least partially define a second slot, which receives the second legs of both of the inner and outer seal members.

6. The seal assembly of claim 1, further comprising a side seal that extends radially from the first seal structure and seals a gap between the transition seal structure and a transition seal structure of a circumferentially adjacent transition duct.

7. The seal assembly of claim 1, wherein the first seal structure comprises an outer seal structure associated with a radially outer portion of the transition seal structure, and further comprising:
 a second seal structure comprising an inner seal structure including inner and outer seal members, each seal member of the second seal structure having a radially extending first leg and an axially extending second leg that extends transversely from a junction with the first leg to provide each seal member with an L or V-shape, each seal member including a plurality of circumferentially spaced apart notches extending from an edge of at least one of the first and second legs toward the junction;
 wherein:
  the inner and outer seal members of the second seal structure are arranged in a nested relationship with one of the seal members being positioned between the first and second legs of the other seal member such that the respective junctions of the inner and outer seal members of the second seal structure are adjacent to one another;
  at least one of the first and second legs of both of the inner and outer seal members of the second seal structure is received in a corresponding slot defined at least in part by one of the transition seal structure and the vane seal structure; and
  the inner and outer seal members of the second seal structure are arranged such that at least some of the notches of the inner seal member are not circumferentially aligned with the notches of the outer seal member.

8. A seal assembly between a transition seal structure associated with a downstream end of a transition duct and a vane seal structure associated with an upstream end of a vane structure in a first row vane assembly of a gas turbine engine, the seal member comprising:
an outer seal structure comprising inner and outer seal members, each seal member having a radially extending first leg and an axially extending second leg that extends transversely from a junction with the first leg to provide each seal member with an L or V-shape; wherein:
the inner and outer seal members are arranged in a nested relationship with one of the seal members being positioned between the first and second legs of the other seal member such that the respective junctions of the inner and outer seal members are adjacent to one another; and
at least one of the first and second legs of both of the inner and outer seal members is received in a corresponding slot defined at least in part by one of the transition seal structure and the vane seal structure; and
an inner seal structure comprising inner and outer seal members, each seal member of the inner seal structure having a radially extending first leg and an axially extending second leg that extends transversely from a junction with the first leg to provide each seal member with an L or V-shape; wherein:
the inner and outer seal members of the inner seal structure are arranged in a nested relationship with one of the seal members being positioned between the first and second legs of the other seal member such that the respective junctions of the inner and outer seal members are adjacent to one another; and
at least one of the first and second legs of both of the inner and outer seal members of the inner seal structure is received in a corresponding slot defined at least in part by one of the transition seal structure and the vane seal structure; and
wherein the inner and outer seal members of the respective inner and outer seal structures comprise anti-rotation slots, the anti-rotation slots are formed in the at least one of the first and second legs of both of the inner and outer seal members of the respective inner and outer seal structures and are circumferentially aligned with one another,
wherein the first legs of both of the inner and outer seal members of the outer seal structure are received in a first slot of the outer seal structure,
wherein the first slot of the outer seal structure is defined by an annular flange of the transition seal structure,
wherein the first slot of the outer seal structure comprises a plurality of circumferentially spaced apart transition seal retainers that are affixed to the annular flange, and
wherein at least a portion of the first legs of both of the inner and the outer seal members of the outer seal structure are arranged between the annular flange and the plurality of circumferentially spaced apart transition seal retainers.

9. The seal assembly of claim 8, wherein the first and second legs of both of the inner and outer seal members of the inner seal structure are received in corresponding first and second slots of the inner seal structure, the first slot of the inner structure defined at least in part by the transition seal structure and the second slot of the inner seal structure defined at least in part by the vane seal structure.

10. The seal assembly of claim 8, further comprising respective outer and inner anti-rotation pins extending from at least one of the transition seal structure and the vane seal structure into the corresponding anti-rotation slots, the anti-rotation pins militating against circumferential movement of the corresponding inner and outer seal members of the outer and inner seal structures relative to the at least one of the respective transition seal structure and the vane seal structure.

11. The seal assembly of claim 8, wherein the vane seal structure includes a plurality of circumferentially spaced apart vane seal retainers that collectively at least partially define a second slot of the outer seal structure, which receives the second legs of both of the inner and outer seal members of the outer seal structure.

12. The seal assembly of claim 8, further comprising a side seal that extends radially from the outer seal structure to the inner seal structure and seals a gap between the transition seal structure and a transition seal structure of a circumferentially adjacent transition duct.

13. The seal assembly of claim 8, wherein each of the inner and outer seal members of the inner and outer seal structures includes a plurality of circumferentially spaced apart notches extending from an edge of at least one of the first and second legs of the respective seal members toward the corresponding junction.

14. The seal assembly of claim 13, wherein the inner and outer seal members of the inner and outer seal structures are arranged such that at least some of the notches of the inner seal members are not circumferentially aligned with the notches of the corresponding outer seal members.

* * * * *